US008510719B2

(12) United States Patent (10) Patent No.: US 8,510,719 B2
Cooper et al. (45) Date of Patent: Aug. 13, 2013

(54) REAL-TIME USER CONFIGURABLE DEBUGGING FRAMEWORK

(75) Inventors: Mark D. Cooper, Poughkeepsie, NY (US); Christopher D. Filachek, Poughkeepsie, NY (US); Adris E. Hoyos, Poughkeepsie, NY (US); Samuel K. Lee, Poughkeepsie, NY (US); Shonta S. Singleton, Poughkeepsie, NY (US); Isa M. Torres, Poughkeepsie, NY (US); Mei Hui Wang, Poughkeepsie, NY (US); Joshua B. Wisniewski, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 940 days.

(21) Appl. No.: 12/613,034

(22) Filed: Nov. 5, 2009

(65) Prior Publication Data

US 2011/0107308 A1    May 5, 2011

(51) Int. Cl.
*G06F 9/44* (2006.01)
*G06F 9/445* (2006.01)

(52) U.S. Cl.
USPC .......................................... 717/127; 717/104

(58) Field of Classification Search
None
See application file for complete search history.

(56) References Cited

U.S. PATENT DOCUMENTS

| | | | | |
|---|---|---|---|---|
| 2007/0143093 | A1* | 6/2007 | Alvey et al. | 703/22 |
| 2007/0157174 | A1* | 7/2007 | Gebhardt et al. | 717/124 |
| 2008/0115145 | A1* | 5/2008 | Codrescu et al. | 719/312 |
| 2009/0307652 | A1* | 12/2009 | Maybee et al. | 717/104 |

OTHER PUBLICATIONS

University of Melbourne, [online]; [retrieved on Nov. 5, 2009]; retrieved from the Internet http://www.cs.mu.oz.au/research/mercury/information/doc-latest/mercury_user_guide/Mercury-debugger-concepts.html "7.7 Mercury debugger concepts" The Mercury User's Guide, 4 pgs, University of Melbourne.
University of Melbourne, [online]; [retrieved on Nov. 5, 2009]; retrieved from the Internet http://www.cs.mu.oz.au/research/mercury/information/doc-latest/mercury_user_guide/User-defined-events.html "7.8 User Defined Events" The Mercury User's Guide, 2pgs, University of Melbourne.

* cited by examiner

*Primary Examiner* — Hyun Nam
(74) *Attorney, Agent, or Firm* — Cantor Colburn LLP; Steven Chiu

(57) ABSTRACT

Methods, systems, and computer program products for implementing a real-time, user configurable, debugging framework for use in debugging applications. A method includes executing an application on a computer, the application comprising a plurality of instructions including a debug macro instruction. The debug macro instruction is associated with a set of parameters for describing one or both of system and application conditions. The method also includes specifying one or more trigger criteria, the trigger criteria comprising a set of dynamic values for the set of parameters. The method further performing, while the application is executing, executing the debug macro instruction, detecting whether the trigger criteria have been met by the application, the detecting in response to executing the debug macro instruction, and upon detecting that the trigger criteria have been met, initiating a debugging session in response to the detecting.

17 Claims, 3 Drawing Sheets

REAL-TIME USER CONFIGURABLE DEBUGGING FRAMEWORK

BACKGROUND

This invention relates generally to processing within a computing environment, and more particularly to a real-time user configurable debugging framework.

Typical debugging frameworks allow programmers to halt execution at a given place in the machine code by selecting a point in the source code. The debugger halts execution when this point is reached. Once the debugger has halted the application, an application developer or quality assurance analyst can choose to step through the application one line at a time, or they can inspect the current value of various parameters in the application. Developers use debuggers to help them diagnose bugs that have been identified in software applications and hardware systems. As the applications and hardware gets more complex software bugs become more likely. At the same time, more complex applications, such as those that include multiple processes running simultaneously under multiple conditions and scenarios, create an environment that makes typical debugging systems increasingly difficult to manage.

BRIEF SUMMARY

Embodiments of the invention include methods for implementing a real-time, user configurable, debugging framework for use in debugging applications. A method includes executing an application on a computer, the application comprising a plurality of instructions including a debug macro instruction. The debug macro instruction is associated with a set of parameters for describing one or both of system and application conditions. The method also includes specifying one or more trigger criteria, the trigger criteria comprising a set of dynamic values for the set of parameters. The method further performing, while the application is executing, executing the debug macro instruction, detecting whether the trigger criteria have been met by the application, the detecting in response to executing the debug macro instruction, and upon detecting that the trigger criteria have been met, initiating a debugging session in response to the detecting.

Additional embodiments include a computer program product for implementing a real-time, user configurable, debugging framework for use in debugging applications. A computer program product includes a tangible storage medium readable by a processing circuit and storing instructions for execution by the processing circuit for performing a method. The method includes executing an application on a computer, the application comprising a plurality of instructions including a debug macro instruction. The debug macro instruction is associated with a set of parameters for describing one or both of system and application conditions. The method also includes specifying one or more trigger criteria, the trigger criteria comprising a set of dynamic values for the set of parameters. The method further performing, while the application is executing, executing the debug macro instruction, detecting whether the trigger criteria have been met by the application, the detecting in response to executing the debug macro instruction, and upon detecting that the trigger criteria have been met, initiating a debugging session in response to the detecting.

Further embodiments include systems for implementing a real-time, user configurable, debugging framework for use in debugging applications. A system includes a computer and a real-time user configurable debugging framework executable by the computer. The real-time user configurable debugging framework capable of performing a method. The method includes executing an application on a computer, the application comprising a plurality of instructions including a debug macro instruction. The debug macro instruction is associated with a set of parameters for describing one or both of system and application conditions. The method also includes specifying one or more trigger criteria, the trigger criteria comprising a set of dynamic values for the set of parameters. The method further performing, while the application is executing, executing the debug macro instruction, detecting whether the trigger criteria have been met by the application, the detecting in response to executing the debug macro instruction, and upon detecting that the trigger criteria have been met, initiating a debugging session in response to the detecting.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides for a real-time user configurable debugging framework.

Debuggers typically require some boundary condition to occur in order to start a debugger session on a given application. A boundary condition could be a program entry, a function entry, a system error, or a hardware interrupt, etc. However, this limitation of requiring a boundary condition to occur can make it difficult or impossible to test all application conditions. For example, an application could be started thousands of times per second, with a user only interested in debugging the application when a given set of conditions occur in the application code. Another example is that a user may need to debug an application started from a given communications protocol based on multiple conditions in the protocol (host connection details, message content, etc). In addition, users may need to debug an application only when a particular transaction is at a particular point in the application, while allowing other transactions to pass through uninterrupted.

Figure 1:
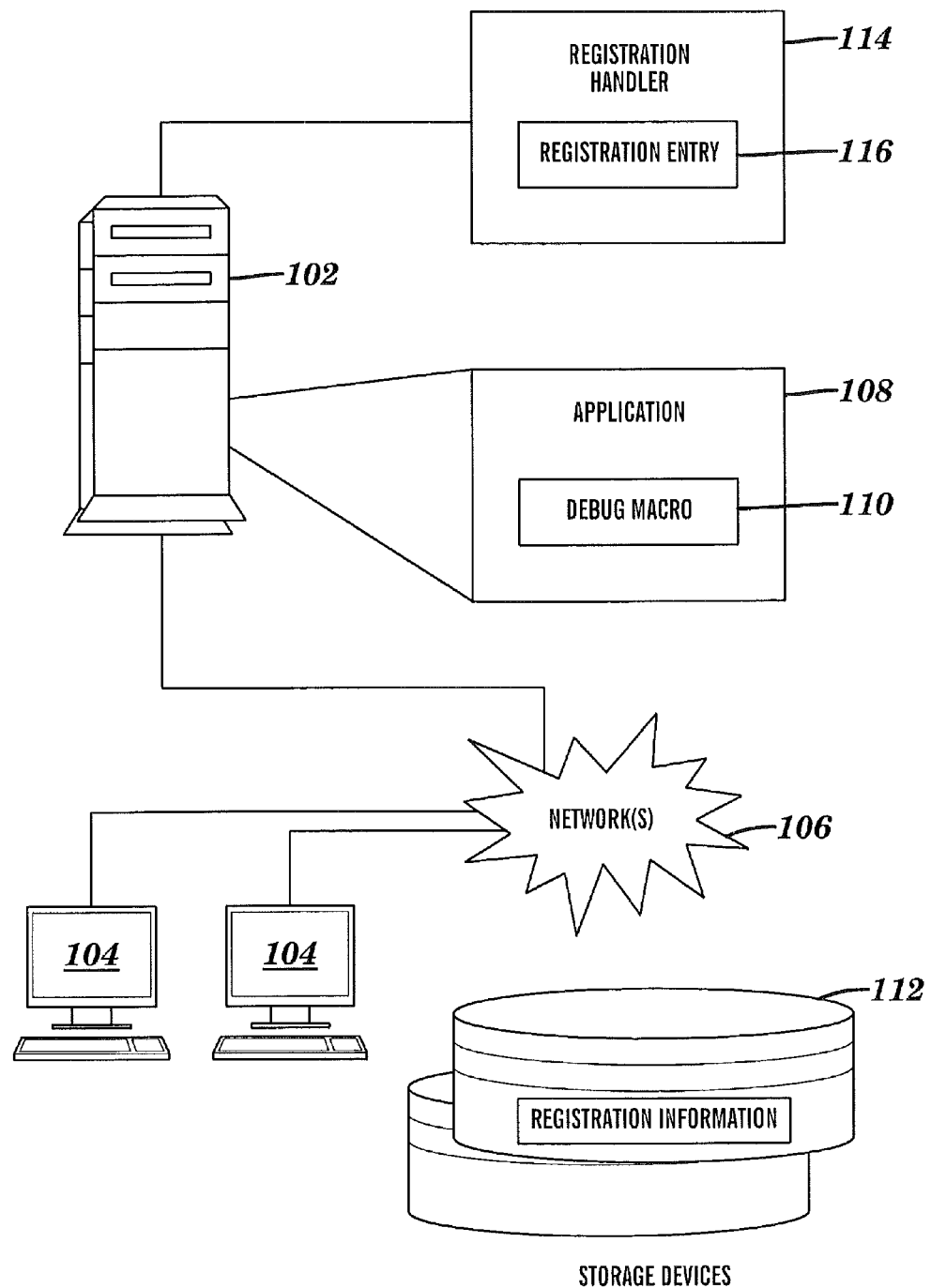
FIG. 1 depicts a block diagram of a real-time user configurable debugging framework that may be implemented by an exemplary embodiment.

Turning now to FIG. 1, a system 100 for implementing real-time user configurable debugging frameworks will now be described. In an exemplary embodiment, the system 100 includes a host system computer 102 executing computer instructions for implementing the real-time user configurable debugging framework. Host system computer 102 may operate in any type of environment that is capable of executing a software application. Host system computer 102 may comprise a high-speed computer processing device, such as a mainframe computer, to manage the volume of operations governed by an entity for which the real-time user configurable debugging framework is executing. In an exemplary embodiment, the host system computer 102 is part of an enterprise (e.g., a commercial business) that implements the real-time user configurable debugging framework. In another exemplary embodiment, the host system computer 102 is configured to execute on operating system suitable for executing a plurality of applications and instructions. The operating system could be any operating system, for example a transaction processing facility such as the Transaction Processing Facility operating system from IBM®, or any other operating system suitable for executing applications.

In an exemplary embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers or quality assurance specialists) of the real-time user configurable debugging framework described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one exemplary embodiment, the networks 106 include an intranet and one or more client systems 104 execute a user interface application (e.g., a web browser) to contact the host system computer 102 through the networks 106. In another exemplary embodiment, the client system 104 is connected directly (i.e., not through the networks 106) to the host system computer 102 and the host system computer 102 contains memory for storing data in support of the real-time user configurable debugging framework. Alternatively, a separate storage device (e.g., storage device 112) may be implemented for this purpose.

In an exemplary embodiment, the storage device 112 includes a data repository with data relating to the real-time user configurable debugging framework used by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an exemplary embodiment, the storage device 112 includes one or more databases containing, registration entries (also referred to herein as "trigger criteria") and corresponding configuration parameters (also referred to herein as "parameters" and "set of parameters"), dynamic values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the real-time user configurable debugging framework. Host system computer 102 includes one or more applications 108 suitable for debugging. Applications 108 contain a plurality of instructions. In an exemplary embodiment, these instructions include instructions for operating the application 108 and one or more debug macros 110 as will be described more fully below. These various types of instructions are referred to herein generically as "instructions." Debug macros communicate with one or more registration handlers 114. Registration handlers 114 may execute on host system computer 102, client system 104, or any combination thereof. The registration handler 114 may execute on the same host system computer 102 as the application 108, or may execute on a separate host system computer or on client systems 104. Registration handlers 114 extract and manage registration information related to registration entries 116 from the storage device 112. The operation of the registration handlers 114 and registration entries 116 are discussed in more detail below.

As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
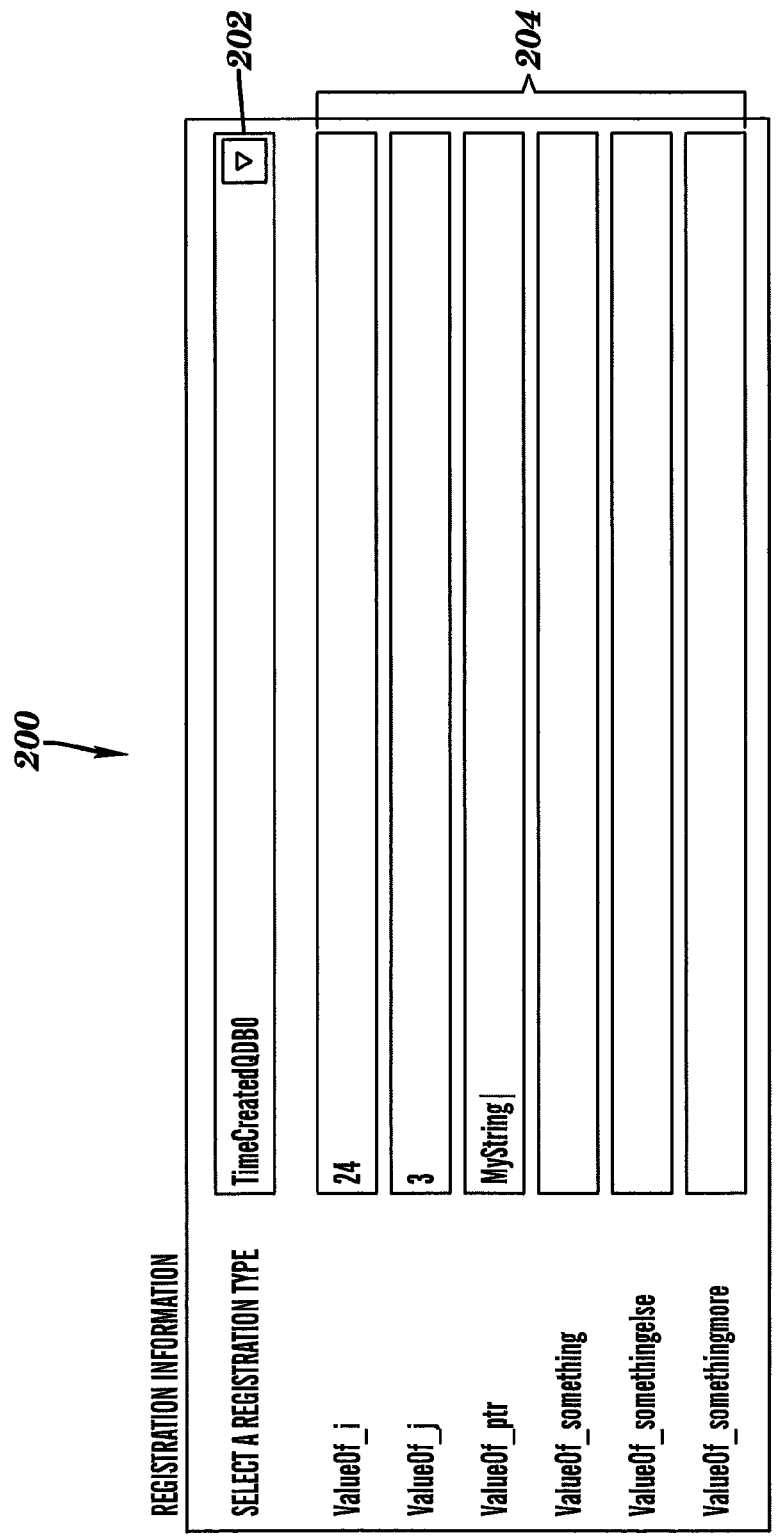
FIG. 2 depicts a graphical user interface that may be used in exemplary embodiments of the current invention for application debugging registration.

FIG. 2 depicts a graphical user interface 200 that may be used in exemplary embodiments of the current invention for registering an application for debugging. The registration type field 202 of the user interface 200 allows users to select a registration type that will be registered for the application. Each registration type is associated with one or more user-selected trigger criteria that are specified by the user via the trigger criteria fields 204 of the user interface 200. It will be understood that the trigger criteria are a combination of a parameter and a dynamic value associated with the parameter.

In an exemplary embodiment, the dynamic value can be any number, letter, or other character or any combination of numbers, letters and other characters. The dynamic values are used to identify the specific conditions that will cause the debugger to initialize, as will be discussed more fully below. In an exemplary embodiment, dynamic values can be changed, dynamically, at runtime, without requiring a recompilation, or a restart of the application or debugging process. In addition, in an exemplary embodiment, the parameters are placeholders that contain the dynamic values and associate them to application or system conditions as will be discussed more fully below. In addition, each registration type is associated with a user-defined function. The user-defined function determines if the trigger criteria have been met by the application 108 and initiates a debugging session, as will be described more fully below.

In exemplary embodiments, the user-defined function may execute as part of the registration handler 114, the debug macro 110 in the application 108, or in its own application space. In addition, the user-defined function can execute on a separate host system computer 102, or on a client system 104. The registration types in combination with the user-selected trigger criteria and registration entries 116, are stored as registration information in the storage device 112 along with an association to the appropriate user-defined function. Although the registration process has been described as implemented by a graphical user interface, it will be understood that the registration process can be implemented by, for example, an XML file, a database entry, or other suitable method.

Figure 3:
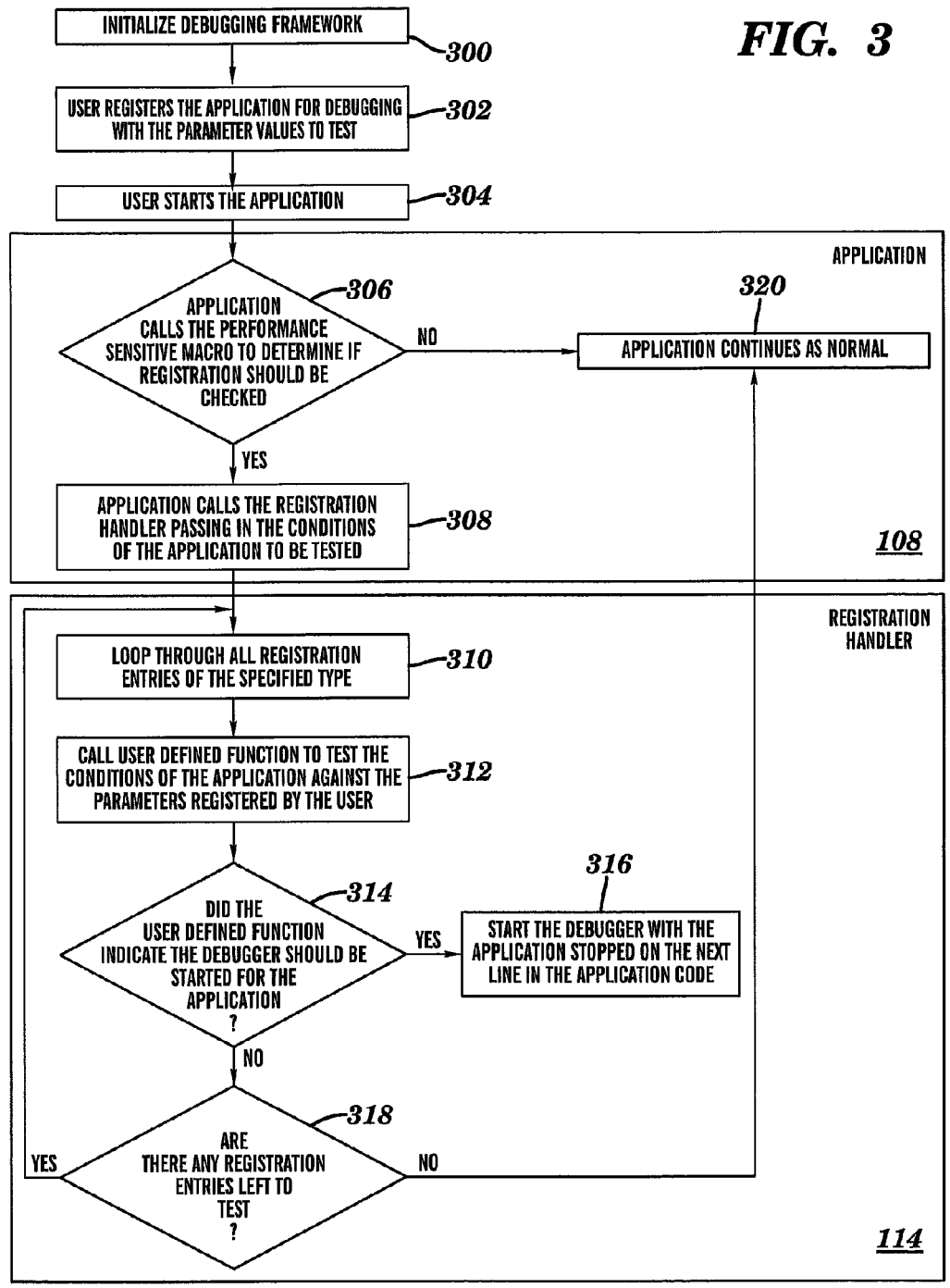
FIG. 3 depicts a process flow that may be implemented by an exemplary embodiment of a real-time user configurable debugging framework.

FIG. 3 is a process flow that may be implemented by an exemplary embodiment of the real-time user configurable debugging framework. In an exemplary embodiment, the process flow executes on the host system computer 102. At block 300 in FIG. 3, the debugging framework is initialized prior to executing the application 108. In an exemplary embodiment, the initialization includes defining the registration types, generating the debug macro instructions to call the registration handler 114, creating the user defined functions associated with the registration types (e.g., called by the registration handler to determine if user specified trigger conditions have been met), and creating an association between a debug macro and one or more registration types.

Turning now to block 302, a user registers an application 108 for debugging by specifying one or more trigger criteria, as described above in reference to FIG. 2. Although the registration process is described as occurring before the execution of the application 108, it will be understood by those skilled in the art that in alternate exemplary embodiments, the registration process can occur any time during the execution of the application 108. At block 304, the user starts the application 108. It will be understood that the application 108 can be executed in a development or test environment, or in a production environment.

At block 306, the application 108 executes a debug macro 110. In an exemplary embodiment, the debug macro 110 is embedded in the application 108 and is executed sequentially along with other application code instructions. In an exemplary embodiment, the debug macro 110 is performance sensitive and is therefore designed to minimize impact on performance by executing as few instructions as possible. The debug macro 110 limits its impact on performance by executing an instruction that calls the registration handler 114 to determine if any registration entries 116 associated with the debug macro 110 have been specified before collecting any data related to application and/or system conditions. If the debug macro 110 successfully verifies that registration entries 116 exist for one or more of the registration types, then block 308 is processed. In an additional exemplary embodiment, the debug macro 110 will further limit its impact on performance by executing an instruction which detects if the application 108 is being executed in production, and, if so, make no calls to the registration handler 114 and thereby bypass any further debugging steps.

At block 308, the application 108 calls the registration handler 114 and passes the conditions of the application 108 and/or system to the registration handler 114. In an exemplary embodiment the conditions of the application 108 include, but are not limited to, variables and memory settings that are currently in the application scope. Conditions of the system include, but are not limited to global system variables, system state indicators, and file system content. It will also be understood that all or a subset of the conditions may be passed to the registration handler 114. It will also be understood that the conditions (e.g., variables) can be passed to the registration handler 114 as pointers to memory locations, or as the condition values (e.g., variable values) themselves.

At block 310 the registration handler 114 retrieves all of the registration entries 116 associated with the registration type of the debug macro 110 and loops through each of the matching registration entries 116. At block 312, the registration handler 114 executes the user-defined function associated with the registration type for each matching registration entry 116 retrieved at block 310. In an exemplary embodiment, the registration handler passes the application values received from the debug macro 110 to the user-defined function. At block 314, the user-defined function analyzes the application and/or system conditions and detects if the threshold values of the trigger criteria have been met. The threshold values have been met if the application parameters meet the trigger criteria as defined by instructions in the user-defined function. Although the process of passing application and/or system conditions to the user-defined function has been described as occurring between the registration handler 114 and the user-defined function, it will be understood that, in another exemplary embodiment, the parameters could be passed directly from the debug macro 110 to the user-defined function, and in a further exemplary embodiment, the user defined function can test application and/or system conditions without being passed any variables or values. If the user-defined function detects that the parameters meet the debug threshold, a debugger is initiated at block 316. In an exemplary embodiment, the debugging environment is instantiated and the execution of the current process is halted while the user selects either a break point in the execution, or steps through the application 108 one code instruction at a time.

Returning to block 314, if the user-defined function determines that the debug threshold has not been meet, the registration handler 114, at block 318, determines if there are more registration entries 116 for the current registration type. If there are more registration entries 116, execution continues at block 310. If there are no more registration entries 116, at block 320 the application 108 continues normal execution.

Returning to block 306, if the debug macro 110 determines that there are no registration entries 116 that match the registration type associated with the debug macro 110, execution moves directly to block 320 bypassing all of the previous blocks thereby limiting the impact to performance.

Technical effects and benefits include allowing a user to start a debugger session on virtually any application under multiple conditions defined and specified dynamically by the user. The user can define a location in their application that is not on any given boundary to start a debugger on their application. In exemplary embodiments, the user can specify the conditions under which a debugger session will be initiated by registering their application for debugging. This flexibility allows the user to debug precisely the conditions of the application that the user is interested in debugging. In addition, the debugging framework provides a lightweight and efficient debugging session verification mechanism. This verification mechanism provides the capability of deploying production applications with embedded debugging code that can be activated by a user without requiring restarting or recompiling the application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for executing a real-time user configurable debugging framework, the method comprising:
    executing an application on a computer, the application comprising a plurality of instructions including a debug macro instruction that specifies a set of parameters for describing one or both of system and application conditions;
    specifying one or more trigger criteria, the trigger criteria comprising a set of dynamic values for the set of parameters; and
    performing while the application is executing:
    executing the debug macro instruction;
    detecting whether the trigger criteria have been met by the application, the detecting in response to executing the debug macro instruction; and
    upon detecting that the trigger criteria have been met, initiating a debugging session in response to the detecting.

2. The method of claim 1, wherein the set of dynamic values comprises threshold values for each of the parameters in the set of parameters.

3. The method of claim 1, wherein the specifying one or more trigger criteria is performed while the application is executing.

4. The method of claim 1, wherein the specifying one or more trigger criteria is performed prior to the application executing.

5. The method of claim 1, wherein the debug macro specifies a second set of parameters that differ from the set of parameters.

6. The method of claim 1, further comprising:
    specifying one or more second trigger criteria that differ from the trigger criteria;
    detecting whether the second trigger criteria have been met by the application, the detecting in response to executing the debug macro instruction; and
    upon detecting that the second trigger criteria have been met, initiating a debugging session in response to the detecting.

7. The method of claim 1, wherein the computer comprises one or more computer processors executing an operating system, the operating system comprising a transaction processing facility.

8. A computer program product for implementing a real-time user configurable debugging framework, the computer program product comprising:
    a computer readable storage medium having program code embodied therewith, the program code executable by a processing circuit to perform a method comprising:
    executing an application on a computer, the application comprising a plurality of instructions including a debug macro instruction that specifies a set of parameters for describing one or both of system and application conditions;
    specifying one or more trigger criteria, the trigger criteria comprising a set of dynamic values for the set of parameters; and
    performing while the application is executing:
    executing the debug macro instruction;
    detecting whether the trigger criteria have been met by the application, the detecting in response to executing the debug macro instruction; and
    upon detecting that the trigger criteria have been met, initiating a debugging session in response to the detecting.

9. The computer program product of claim 8, wherein the set of dynamic values comprises threshold values for each of the parameters in the set of parameters.

10. The computer program product of claim 8, wherein the specifying one or more trigger criteria is performed while the application is executing.

11. The computer program product of claim 8, wherein the specifying one or more trigger criteria is performed prior to the application executing.

12. The computer program product of claim 8, wherein the computer comprises one or more computer processors executing an operating system, the operating system comprising a transaction processing facility.

13. A system for implementing a real-time user configurable debugging framework, the system comprising:
    a computer processor; and
    a real-time user configurable debugging framework executable by the computer processor, the real-time user configurable debugging framework configured to perform a method comprising:
    executing an application on a computer, the application comprising a plurality of instructions including a debug macro instruction that specifies a set of parameters for describing one or both of system and application conditions;

specifying one or more trigger criteria, the trigger criteria comprising a set of dynamic values for the set of parameters; and performing while the application is executing:

executing the debug macro instruction;

detecting whether the trigger criteria have been met by the application, the detecting in response to executing the debug macro instruction; and upon detecting that the trigger criteria have been met, initiating a debugging session in response to the detecting.

14. The system of claim 13, wherein the set of dynamic values comprises threshold values for each of the parameters in the set of parameters.

15. The system of claim 13, wherein the specifying one or more trigger criteria is performed while the application is executing.

16. The system of claim 13, wherein the specifying one or more trigger criteria is performed prior to the application executing.

17. The system of claim 13, wherein the computer processor further executes an operating system that comprises a transaction processing facility.

* * * * *